US010714771B2

(12) United States Patent
Procter et al.

(10) Patent No.: US 10,714,771 B2
(45) Date of Patent: Jul. 14, 2020

(54) BELOW FREEZING START-UP METHOD FOR FUEL CELL SYSTEM

(71) Applicants: Daimler AG, Stuttgart (DE); Ford Motor Company, Dearborn, MI (US); Nissan Motor Co., LTD., Yokohama (JP)

(72) Inventors: Michael Procter, North Vancouver (CA); Yosuke Fukuyama, Vancouver (CA); Richard Fellows, Vancouver (CA); Takeshi Shiomi, Burnaby (CA); Laura Iwan, Burnaby (CA)

(73) Assignees: Daimler AG, Stuggart (DE); Ford Motor Company, Dearborn, MI (US); Nissan Motor Co., LTD., Kanagawa (JP)

( * ) Notice: Subject to any disclaimer, the term of this patent is extended or adjusted under 35 U.S.C. 154(b) by 0 days.

(21) Appl. No.: 16/330,033

(22) PCT Filed: Aug. 25, 2017

(86) PCT No.: PCT/IB2017/001020
§ 371 (c)(1),
(2) Date: Mar. 1, 2019

(87) PCT Pub. No.: WO2018/046993
PCT Pub. Date: Mar. 15, 2018

(65) Prior Publication Data
US 2019/0207233 A1     Jul. 4, 2019

Related U.S. Application Data

(60) Provisional application No. 62/385,225, filed on Sep. 8, 2016.

(51) Int. Cl.
| | | |
|---|---|---|
| *H01M 8/04223* | (2016.01) | |
| *H01M 8/04858* | (2016.01) | |
| *H01M 8/0432* | (2016.01) | |
| *H01M 8/04537* | (2016.01) | |
| *H01M 8/10* | (2016.01) | |
| H01M 8/1018 | (2016.01) | |
| H01M 8/18 | (2006.01) | |

(52) U.S. Cl.
CPC ..... *H01M 8/04268* (2013.01); *H01M 8/0432* (2013.01); *H01M 8/0491* (2013.01); *H01M 8/04559* (2013.01); *H01M 8/04649* (2013.01); *H01M 8/10* (2013.01); *H01M 8/186* (2013.01); *H01M 2008/1095* (2013.01); *H01M 2250/20* (2013.01); *Y02E 60/528* (2013.01); *Y02T 90/32* (2013.01)

(58) Field of Classification Search
None
See application file for complete search history.

(56) References Cited

U.S. PATENT DOCUMENTS

| | | |
|---|---|---|
| 6,936,370 B1 | 8/2005 | Knights |
| 2011/0076581 A1 | 3/2011 | Lai |
| 2012/0214084 A1 | 8/2012 | Sharman |
| 2013/0095405 A1 | 4/2013 | Kawahara |

FOREIGN PATENT DOCUMENTS

| | | |
|---|---|---|
| JP | 4998609 B2 | 8/2012 |
| JP | 5287815 B2 | 9/2013 |
| JP | 5200414 B2 | 6/2015 |

OTHER PUBLICATIONS

PCT International Search Report and Written Opinion dated Oct. 16, 2017.

*Primary Examiner* — Sarah A. Slifka
(74) *Attorney, Agent, or Firm* — Farjami & Farjami LLP

(57) ABSTRACT

Methods are disclosed for starting up a fuel cell system from starting temperatures below 0° C. The methods apply to systems comprising a solid polymer electrolyte fuel cell stack whose cathodes comprise an oxygen reduction reaction (ORR) catalyst and whose anodes comprise both a hydrogen oxidation reaction (HOR) catalyst and an oxidation evolution reaction (OER) catalyst. In the methods, from the beginning of starting up until the fuel cell temperature reaches 0° C., the fuel cell stack current is kept sufficiently low such that the current density drawn does not exceed the stack's capability for the oxidation evolution and the oxygen reduction reactions to occur at the anode and cathode respectively (i.e. current density drawn is less than the stack's maximum OER/ORR current density).

14 Claims, 3 Drawing Sheets

BELOW FREEZING START-UP METHOD FOR FUEL CELL SYSTEM

BACKGROUND

Field of the Invention

This invention relates to improved methods for starting up a fuel cell system at temperatures below freezing. In particular, it relates to methods for starting up an automotive fuel cell system comprising a solid polymer electrolyte fuel cell stack.

Description of the Related Art

Fuel cells such as solid polymer electrolyte fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). MEAs in which the electrodes have been coated onto the membrane electrolyte to form a unitary structure are commercially available and are known as a catalyst coated membrane (CCM).

Catalysts are used to enhance the rate of the electrochemical reactions which occur at the cell electrodes. Catalysts based on noble metals such as platinum are typically required in order to achieve acceptable reaction rates, particularly at the cathode side of the cell. To achieve the greatest catalytic activity per unit weight, the noble metal is generally disposed on a corrosion resistant support with an extremely high surface area, e.g. high surface area carbon particles.

Water is the primary by-product in a cell operating on hydrogen and air reactants. In operation, hydrogen is oxidized at the anode catalyst to create a hydrogen ion (proton) and an electron. The former is transported through the proton conducting polymer electrolyte to the cathode, while the latter is transported to the cathode through an external circuit thereby providing useful electrical power. This normal reaction at the anode catalyst is known as the hydrogen oxidation reaction (HOR). At the cathode catalyst, oxygen is reduced and is combined with the proton and electron to create water. This reaction at the cathode catalyst is known as the oxygen reduction reaction (ORR).

Porous gas diffusion layers (GDLs) are usually employed adjacent the two electrodes to assist in diffusing the reactant gases evenly to the electrodes. Further, an anode flow field plate and a cathode flow field plate, each comprising numerous fluid distribution channels for the reactants, are provided adjacent the anode and cathode GDLs respectively to distribute reactants to the respective electrodes and to remove by-products of the electrochemical reactions taking place within the fuel cell. Because the output voltage of a single cell is of order of IV, a plurality of cells is usually stacked together in series for commercial applications in order to provide a higher output voltage. In such a stack, the anode flow field plate of one cell is thus adjacent to the cathode flow field plate of the adjacent cell. For assembly purposes, a set of anode flow field plates is often bonded to a corresponding set of cathode flow field plates prior to assembling the stack. A bonded pair of an anode and a cathode flow field plate is known as a bipolar plate assembly. Fuel cell stacks can be further connected in arrays of interconnected stacks in series and/or parallel for use in automotive applications and the like.

Along with water, heat is a significant by-product from the electrochemical reactions taking place within a fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

In certain applications, fuel cell stacks may be subjected to repeated on-off duty cycles involving storage for varied lengths of time and at varied temperatures. It is generally desirable to be able to reliably start-up such stacks in a short period of time. Certain applications, like automotive, can require relatively rapid reliable start-up from storage conditions well below freezing. This has posed a significant challenge both because of the relatively low rate capability of cells at such temperatures and also because of problems associated with water management in the cells when operating below 0° C. A certain amount of water is required for proper fuel cell operation (e.g. hydration of the membrane electrolyte) and water is also generated as a result of providing electrical power. However, ice of course forms where liquid water is present at such temperatures.

The presence of ice can be problematic depending on how much there is and its location when stored or when starting up. The formation of ice in the electrochemically active areas of the fuel cells can be particularly problematic during startup from below freezing temperatures. For instance, ice can block the flow of fuel in or to the anode in a cell or cells in a fuel cell stack. The now inadequate supply of fuel in that cell or cells can result in a condition known as fuel starvation. A cell undergoing fuel starvation can then be driven into voltage reversal by the current from other cells in the series stack. The affected cell or cells can suffer severe damage depending on the extent and duration of the voltage reversal.

U.S. Pat. No. 6,936,370 discusses various circumstances which can result in a fuel cell being driven into voltage reversal as well as the reactions taking place within. For instance, in order to pass current during fuel starvation, reactions such as water electrolysis and oxidation of anode components may take place at the fuel cell anode. The latter reactions can result in irreversible damage. However, promoting the former electrolysis reaction over anode component oxidation can make fuel cells much more tolerant to cell reversal. This can be accomplished by incorporating a catalyst composition at the anode to promote the water electrolysis reaction, in addition to the typical anode catalyst used to promote fuel oxidation (i.e. HOR). The incorporated catalyst composition is thus selected specifically to electrolyze water and is commonly known as an oxidation evolution reaction (OER) catalyst. A typical catalyst composition for this purpose comprises iridium oxide. Other related catalyst compositions have been disclosed in the art, for instance in US20120214084.

Numerous other techniques have been developed in the field to detect voltage reversal conditions and to prevent damage that might result from voltage reversal. For instance, granted Japanese patents JP5200414 and JP5287815 disclose methods for detecting voltage reversal at either electrode. Granted Japanese patent JP4998609 on the other hand discloses a method for avoiding degradation during voltage reversal. Here, a control unit pre-stores a correlation between accumulated current values and current densities that are allowable for the fuel cell in a period during which negative voltage is generated. When negative voltage has been detected, the control unit executes output restricting process of restricting electric power output from the fuel cell so as to fall within an operation allowable range defined by the accumulated current values and current densities of the correlation. In another example, US20130095405 discloses a fuel cell system which includes an accumulated current value measuring unit. The accumulated current value measuring unit measures an accumulated current value by time integration of current output from the fuel cell in a period during which oxygen is produced by water-splitting reaction in an anode of a negative voltage cell. A control unit uses a first correlation between the accumulated current value in the oxygen generation period and an oxygen consumption rate in the anode and a second correlation between a current density of the fuel cell in the oxygen generation period and an oxygen production rate in the anode to obtain a current density at or below which the amount of oxygen in the anode may be reduced, and causes the fuel cell to output electric power at a current density lower than the obtained current density.

Despite the advances made to date, there remains a need for faster methods for starting up fuel cell systems from subzero temperature, while still avoiding any degradation due to voltage reversals which may occur during startup. This invention represents an option for fulfilling these needs and provides further related advantages.

SUMMARY

The present invention relates to methods for starting up a fuel cell system in which the system comprises a solid polymer electrolyte fuel cell stack whose cathodes comprise an oxygen reduction reaction (ORR) catalyst and whose anodes comprise both a hydrogen oxidation reaction (HOR) catalyst and an oxidation evolution reaction (OER) catalyst (e.g. such as are disclosed in the aforementioned U.S. Pat. No. 6,936,370). The methods involve starting up the fuel cell system from starting temperatures below 0° C. In the methods, from the beginning of starting up until the fuel cell temperature reaches 0° C., the fuel cell stack current is kept sufficiently low such that the current density drawn does not exceed the stack's capability for the oxidation evolution and the oxygen reduction reactions to occur at the anode and cathode respectively.

Specifically, the inventive method is for starting up a fuel cell system from a starting temperature below 0° C. The method is intended for a system comprising a fuel cell stack comprising a series stack of solid polymer electrolyte fuel cells. In this stack, the fuel cell cathodes comprise an ORR catalyst and the fuel cell anodes comprise both an HOR catalyst and an OER catalyst in which the OER catalyst is different from the HOR catalyst. Such a fuel cell stack is characterized by a maximum output OER/ORR current density in which the maximum OER/ORR current density is the maximum current density output from the fuel cell stack when operating without a supply of fuel. This maximum current density output is a function of fuel cell temperature and relative humidity in the fuel cells. The method itself then comprises, from the beginning of the starting up until the fuel cell temperature reaches 0° C., drawing a current from the fuel cell stack such that the current density drawn is less than the maximum OER/ORR current density at the fuel cell temperature and at maximum water content.

As mentioned, the maximum OER/ORR current density is the maximum current density output from the fuel cell stack when operating without a supply of fuel. The current density drawn that results in an average fuel cell voltage of −2.2 V is a current density that essentially avoids substantial carbon corrosion in the anode and thus such current density can be considered to be the maximum OER/ORR current density.

In a preferred embodiment, for faster start-up, the highest reasonable current density is employed without exceeding the aforementioned limit. For instance then, a preferred embodiment can comprise drawing a current from the fuel cell stack such that the current density drawn is less than but within 10% of the maximum OER/ORR current density at the fuel cell temperature and at maximum water content.

Important information required to carry out the method can be determined prior to starting up the fuel cell system. For instance, this includes determining the maximum OER/ORR current density as a function of temperature below 0° C. prior to starting up the fuel cell system. Further, such information can be determined using a membrane electrode assembly representative of the membrane electrode assemblies in the fuel cells.

In an exemplary embodiment, both the HOR and the ORR catalysts are platinum and the OER catalyst is iridium oxide.

It can be advantageous to take the actual relative humidity in the fuel cells into account when using the method of the invention. Thus, a relevant embodiment additionally comprises determining the maximum OER/ORR current density as a function of relative humidity below 0° C. prior to starting up the fuel cell system.

In those fuel cell systems which additionally comprise a cell voltage monitor for monitoring individual fuel cell voltages in the series stack, the method can additionally comprise monitoring individual fuel cell voltages in the series stack, and reducing the current drawn from the fuel cell stack if any individual fuel cell voltage drops below −2.2 volts. In this way, protection is provided against adverse situations in which both anode and cathode flow fields become blocked during start-up.

Further, the method can simply comprise drawing a constant current from the stack from the beginning of the starting up until the fuel cell temperature reaches 0° C. (i.e. drawing a current from the fuel cell stack such that the current density drawn is less than the maximum OER/ORR current density at the starting temperature and at maximum water content).

Alternatively, in another embodiment the fuel cell system can additionally comprise a temperature monitor for monitoring fuel cell temperature. The method can then comprise monitoring the fuel cell temperature, and desirably increasing the current density drawn from the fuel cell stack as the fuel cell temperature increases such that the current density drawn is less than the maximum OER/ORR current density at the fuel cell temperature.

In yet another embodiment, and to take advantage of changes in relative humidity in the fuel cells while starting up, the fuel cell system can additionally comprise a high frequency resistance monitor which monitors the high frequency resistance of the fuel cell stack. The method can then comprise the steps of:

monitoring the high frequency resistance of the fuel cell stack, estimating the relative humidity in the fuel cells based on the measured high frequency resistance, from the beginning of the starting up, drawing a current from the fuel cell stack such that the current density drawn is less than the maximum OER/ORR current density at the starting temperature and at the starting relative humidity, and increasing the current density drawn from the fuel cell stack as the fuel cell temperature increases and as the relative humidity in the fuel cells increases such that the current density drawn is less than the maximum OER/ORR current density at the fuel cell temperature and at the relative humidity in the fuel cells.

The method of the invention is particularly suitable for use in automotive fuel cell systems. Further, the invention also includes fuel cell systems configured to operate according to such a method.

These and other aspects of the invention are evident upon reference to the attached Figures and following detailed description.

DETAILED DESCRIPTION

Figure 1:
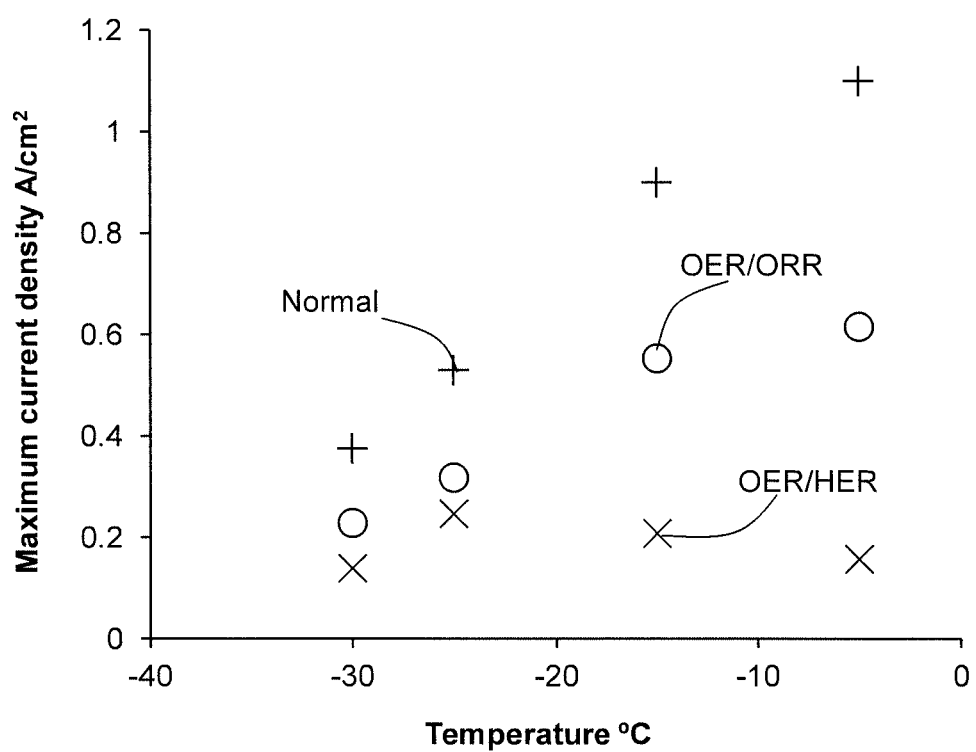
FIG. 1 plots the maximum current densities of a representative fuel cell under various conditions as a function of sub-zero temperature.

In this specification, words such as "a" and "comprises" are to be construed in an open-ended sense and are to be considered as meaning at least one but not limited to just one.

The hydrogen oxidation reaction (abbreviated as HOR) is the normal half reaction in a fuel cell where hydrogen is oxidized at the anode to produce hydrogen ions (protons) and electrons. An HOR catalyst is a catalyst material capable of catalyzing this oxidation half reaction. HOR catalysts include platinum and its alloys or mixtures thereof.

The oxygen reduction reaction (abbreviated as ORR) is the normal half reaction in a fuel cell where oxygen is reduced at the cathode to produce water. An ORR catalyst is a catalyst material capable of catalyzing this reduction half reaction. ORR catalysts include platinum and its alloys or mixtures thereof.

The oxygen evolution reaction (abbreviated as OER) is the electrolysis half reaction which can occur during voltage reversal in a fuel cell where water is oxidized at the anode. An OER catalyst is a catalyst material capable of catalyzing this oxidation half reaction. OER catalysts can also include platinum and its alloys and mixtures. In the context of the present invention however, a relevant OER catalyst is a catalyst different from the ORR catalyst which is included primarily for purposes of providing improved voltage reversal tolerance. As such, OER catalysts are typically iridium and its oxides, ruthenium and its oxides.

The hydrogen evolution reaction (abbreviated as HER) is another half reaction which can occur during voltage reversal in a fuel cell where hydrogen is produced at the cathode. With insufficient oxidant at the cathode (oxidant starvation), protons produced at the anode can cross the electrolyte and combine with electrons directly at the cathode to produce hydrogen gas. An HER catalyst is a catalyst material capable of catalyzing this oxidation half reaction. HER catalysts can also include platinum and its alloys and mixtures.

Herein, the phrase "HOR/ORR current density" refers to current density obtained when a fuel cell is operating normally, that is with HOR occurring at the anode and ORR occurring at the cathode. The "maximum HOR/ORR current density" is the maximum current density which can be obtained from the fuel cell under normal operating conditions.

In a like manner, the phrase "OER/ORR current density" refers to current density obtained when a fuel cell is operating with OER occurring at the anode and ORR occurring at the cathode. This condition arises when the fuel cell is undergoing voltage reversal due to a fuel starvation condition and when OER can be sustained at the anode. This is the case when water is present and when the anode comprises an OER catalyst. The "maximum OER/ORR current density" is then the maximum current density which can be obtained from the fuel cell under these reversal conditions.

Further, the phrase "OER/HER current density" refers to current density obtained when a fuel cell is operating with OER occurring at the anode and HER occurring at the cathode. As mentioned above, HER arises when the fuel cell is undergoing oxidant starvation. Thus, in this situation, the fuel cell is undergoing both fuel and oxidant starvation. Such a condition can occur when blockages occur in both the anode and the cathode in the fuel cell. The "maximum OER/HER current density" is then the maximum current density which can be obtained from the fuel cell under these severe reversal conditions.

The present invention relates to methods for starting up a fuel cell system from starting temperatures below 0° C. and to systems whose fuel cell anodes comprise an OER catalyst for purposes of voltage tolerance. Specifically, the system comprises a solid polymer electrolyte fuel cell stack whose cathodes comprise an ORR catalyst and whose anodes comprise both an HOR and an OER. In such systems in the prior art, the starting current drawn from the stack might typically be set at a very low, conservative, constant value in order to avoid any potential problems during startup. In the event that a cell or cells experienced voltage reversal, the current drawn was set so low that it could always be safely sustained (e.g. by electrolysis reactions at the anode OER catalyst) and thereby prevent damage. However, while this approach can prevent damage to the stack, it also can result in an unnecessarily slow and thus lengthy startup times.

The present invention takes advantage of the understanding that little damage is done to a fuel cell when it is functioning in OER/ORR mode, e.g. when the cell is undergoing a voltage reversal due to anode starvation and with essentially only OER and ORR occurring at the anode and cathode respectively. In general, as long as the current passing through the cell does not exceed the rate that the cell can operate in OER/ORR mode, then damage is essentially prevented. In other words, damage is prevented as long as the current density drawn from the stack is less than the cell's maximum OER/ORR current density. For fastest startup though, it is otherwise advantageous to operate the stack as close to the maximum OER/ORR current density as possible (e.g. within about 10%).

A fuel cell's maximum OER/ORR current density is a function of several factors including temperature and water content in the cell (or relative humidity in the cell). It is however a particularly strong function of the fuel cell temperature. Thus, even though other factors affect a fuel cell's maximum OER/ORR current density, limiting the current based on the fuel cell temperature and the maximum OER/ORR current density at that fuel cell temperature can, for most practical purposes, prevent damage to the stack during startup. Once the fuel cell temperature reaches 0° C., there is no longer a risk of ice formation and an associated voltage reversal due to an ice blockage and thus the current no longer needs to be limited in this way.

As illustrated in the Examples below, the maximum OER/ORR current density is generally greater as the water content in the cell increases. Thus, a fuel cell's maximum OER/ORR current density at a given fuel cell temperature occurs when there is maximum water content in the fuel cell. Further, and also as illustrated in the Examples below, the maximum OER/ORR current density can be determined empirically under anode starvation conditions (e.g. by applying current sweeps to cells and measuring cell voltage). The current density drawn that results in an average fuel cell voltage of −2.2 volts can represent the maximum OER/ORR current density.

The relationship between a fuel cell's maximum OER/ORR current density and fuel cell temperature is preferably determined in advance (e.g. prior to starting up a fuel cell system in an actual application). This may for instance be done using a membrane electrode assembly representative of the membrane electrode assemblies in the actual fuel cells in the stack.

In a very basic embodiment of the invention then, the current drawn from the fuel cell stack is based solely on the starting temperature of the fuel cell stack. That is, the current drawn is constant (until the stack temperature reaches 0° C.) and is limited by the maximum OER/ORR current density at the starting temperature. Again, as mentioned above, for the fastest startup, the current drawn is such that the current density is otherwise as close to the maximum OER/ORR current density as possible (e.g. within about 10%).

However, as the stack temperature increases, the maximum OER/ORR current density of the cells increases too, thereby allowing a greater current to be drawn without adverse effect to the cells in the stack. In a preferred embodiment then, the current drawn during startup increases in accordance with the increase in the maximum OER/ORR current density. For instance, in such a preferred embodiment, the fuel cell system additionally comprises a temperature monitor for monitoring fuel cell temperature. And the method then comprises monitoring the fuel cell temperature and increasing the current density drawn from the fuel cell stack as the fuel cell temperature increases such that the current density drawn is less than the maximum OER/ORR current density at the increasing actual fuel cell temperature.

In the preceding, the effect that the water content in the fuel cell (or relative humidity) has on the maximum OER/ORR current density was not considered. Instead, it was essentially assumed that the water content in the cell was at a maximum. For practical purposes, this is a reasonable assumption because the cell is usually shutdown and stored in a high humidity state. And even though the cell may not truly be in a state of maximum water content, it is close enough that the difference in maximum OER/ORR current density is not significant with regards to protecting the cell against damage in voltage reversal. This is illustrated in the following Examples where only a modest change in maximum OER/ORR current density is evident over a wide humidity range at high humidities. At low water content however (e.g. relative humidities <<50%) there can be a substantial change in maximum OER/ORR current density.

For improved control then, in a preferred embodiment the effect of water content in the fuel cell stack is also considered and taken into account. In such an embodiment, the fuel cell system can additionally comprise a high frequency resistance monitor for monitoring the high frequency resistance of the fuel cell stack. The water content or relative humidity in the fuel cells is then estimated based on this measured high frequency resistance. In the inventive method here then, from the beginning of the starting up, a current is drawn from the fuel cell stack such that the current density drawn is less than the maximum OER/ORR current density at the starting temperature and at the starting relative humidity. Thereafter, the current density drawn from the fuel cell stack is increased as both the fuel cell temperature increases and as the relative humidity in the fuel cells increases such that the current density drawn is less than the maximum OER/ORR current density at the fuel cell temperature and at the relative humidity in the fuel cells.

In other embodiments, additional protection may be incorporated to protect against the possibility of severe ice blockages which may not only block the anode side of a fuel cell (resulting in a fuel starvation condition) but also may block the cathode side of the fuel cell (resulting in an oxidant starvation condition as well). In such a case, the reactions occurring at the anode and cathode are OER and HER respectively.

This more rare kind of "double blockage" condition can significantly limit the current capability of the fuel cell such that it is incapable of providing the expected maximum OER/ORR current density. And as a result, some damage to the cell may be sustained.

In an exemplary embodiment then, protection against such "double blockage" can be provided by incorporating a cell voltage monitor in the system for monitoring individual cell voltages in the series stack. During startup, the individual fuel cell voltages are monitored and the current drawn from the fuel cell stack is reduced if any individual fuel cell voltage drops below about −2.2 volts.

Various methods have thus been disclosed for starting up a fuel cell system from starting temperatures below 0° C. The methods apply to systems comprising a solid polymer electrolyte fuel cell stack whose cathodes comprise an ORR catalyst and whose anodes comprise both a HOR catalyst and an OER catalyst. In the methods, from the beginning of starting up until the fuel cell temperature reaches 0° C., the fuel cell stack current is kept sufficiently low such that the current density drawn does not exceed the stack's capability for the oxidation evolution and the oxygen reduction reactions to occur at the anode and cathode respectively. By limiting the stack to operation in OER/ORR mode, damage is prevented. However, by operating close to the maximum OER/ORR current density, faster startup times can be achieved.

The following examples illustrate certain aspects of the invention but should not be taken as limiting in any way.

EXAMPLES

An experimental fuel cell was prepared using conventional components and construction techniques. Then, the fuel cell's maximum current density was determined under various conditions as a function of temperature and of relative humidity.

The experimental fuel cell comprised a catalyst coated membrane (CCM) sandwiched between two carbon fibre gas diffusion layers (GDLs). The membrane electrolyte in the CCM was a conventional Nafion® perfluorosulfonic ionomer membrane. The anode comprised both a HOR and an OER catalyst, namely carbon black supported platinum and iridium oxide powder respectively. The cathode comprised an ORR catalyst which was also carbon black supported platinum. Flow field plates were applied to each of the GDLs and the assembly was completed in a conventional manner. The cell was then conditioned by operating at a constant current density, with hydrogen and air as the supplied reactants for several hours to obtain a stable steady-state performance. Maximum current density data was then determined as indicated below. In this testing, hydrogen and air were again used as the fuel and oxidant respectively.

FIG. 1 plots the maximum current densities of the experimental fuel cell under various conditions as a function of temperature from −30 to 0° C. Here, the supplied hydrogen was dry and the supplied air at 80% RH. (The maximum current density values represent the maximum applied current density that the cell can sustain until a cell voltage of −2.2 volts is reached. These values were determined as discussed below with regards to FIGS. 2a and 2b.) The various conditions investigated here are denoted in FIG. 1 as "Normal", "OER/ORR", and "OER/HER" (with the data associated with each condition appearing as +s, circles, and Xs respectively).

Under Normal conditions, the anode and cathode were supplied with hydrogen and air respectively at conventional (i.e. normal) pressures and flow rates. The Normal condition thus represents a typical fuel cell suffering no reactant gas blockage and no starvation condition. Under OER/ORR conditions, hydrogen was no longer supplied to the anode thereby causing the fuel cell to undergo fuel starvation. The OER/ORR condition thus simulates, for instance, an ice blockage condition in the anode during low temperature startup. Under OER/HER conditions, hydrogen was no longer supplied to the anode and air was no longer supplied to the cathode thereby causing the fuel cell to undergo both fuel and oxidant starvation. The OER/HER condition thus simulates, for instance, a rare double ice blockage condition in both the anode and the cathode during low temperature startup.

As is apparent from FIG. 1, the maximum OER/ORR current density is less than but still significant compared to the maximum Normal current density. Further, the maximum OER/ORR current density is a significant function of cell temperature.

As is also apparent from FIG. 1, the maximum OER/HER current density is low at all the measured cell temperatures. Thus, while a cell undergoing fuel starvation may be able to sustain a significant current when operating in OER/ORR mode during voltage reversal, a cell undergoing both fuel and oxidant starvation may not be able to sustain the same currents, particularly at as the temperature increases.

Figure 2A:
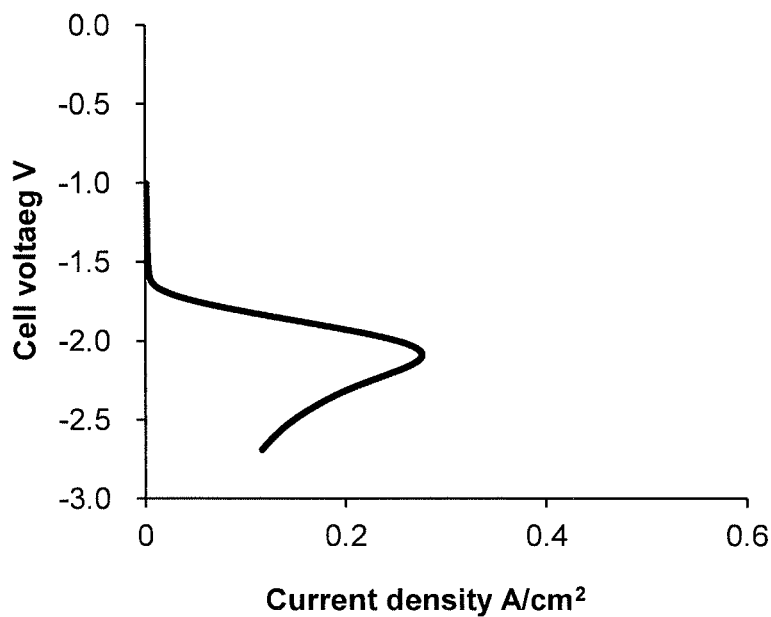
FIGS. 2a and 2b show exemplary CV curves from which the maximum OER/HER and OER/ORR current densities in FIG. 1 can be determined.
Figure 2B:
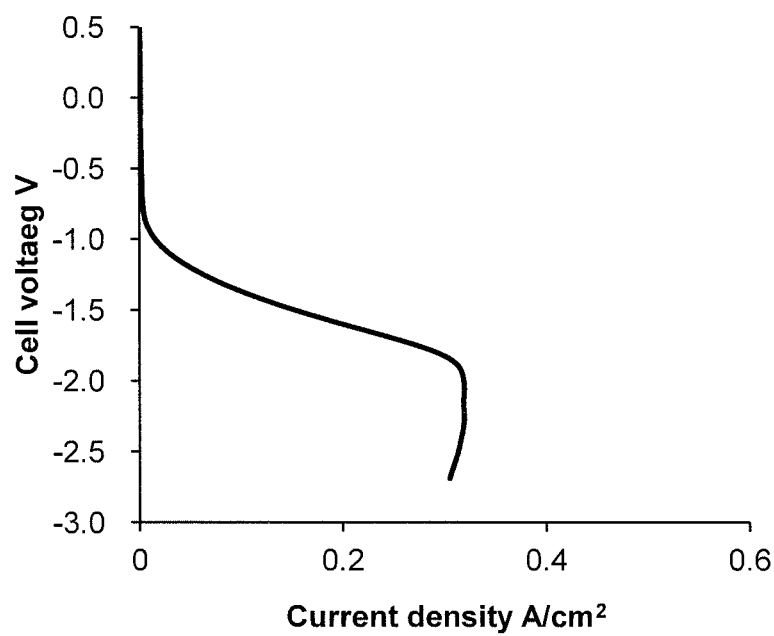

FIGS. 2a and 2b illustrate an exemplary method for determining the maximum current densities of a representative fuel cell. (For instance, this method was used to determine the maximum current densities in FIGS. 1 and 3.) Here, successive current sweeps were applied to the experimental fuel cell under different conditions and the resulting cell voltage was recorded. FIG. 2a shows a sweep of the cell operating under OER/HER conditions at −25° C. The maximum current density here was taken to be the current density at which the cell voltage falls to −2.2 volts in an average current sweep. FIG. 2b shows a sweep cycle of the cell operating under OER/ORR conditions at −25° C. Again, the maximum current density here was taken to be the current density at which the cell voltage falls to −2.2 volts in an average current sweep.

Figure 3:
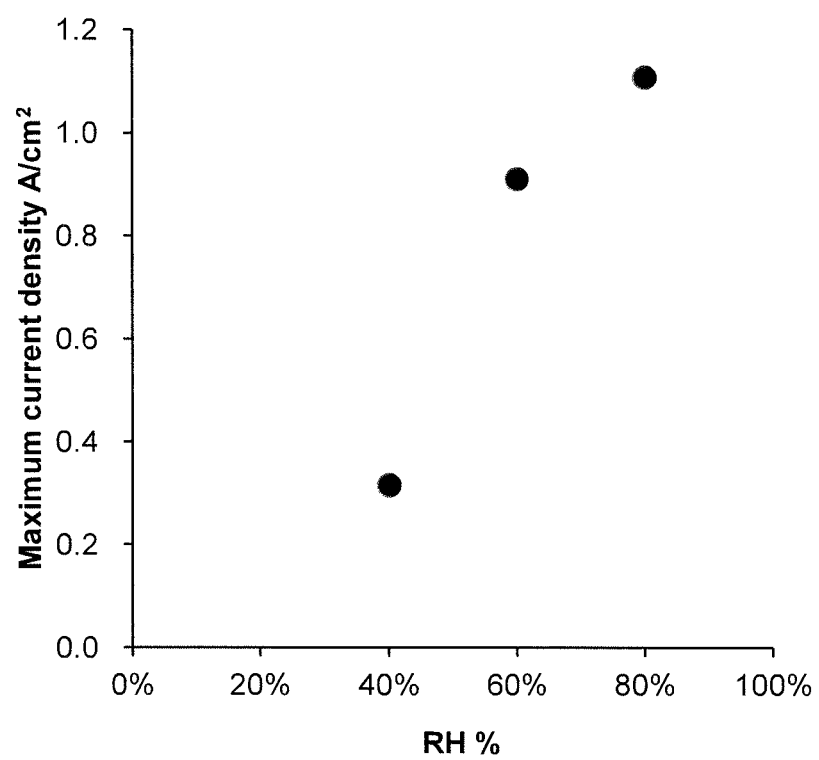
FIG. 3 plots the OER/ORR maximum current density of a representative fuel cell as a function of relative humidity at −15° C.

The effect of varying the relative humidity on maximum current density was also investigated using this experimental fuel cell. Here, both reactants were supplied at the same indicated RH. FIG. 3 plots the OER/ORR maximum current density of the fuel cell as a function of relative humidity at −15° C. As is evident from FIG. 3, the maximum current density only varies modestly over a wide humidity range at high relative humidities (e.g. from circa 60 to 100% RH). However, at low relative humidities the cell is too dry to sustain much current and thus much lower maximum current densities are seen at low RH (e.g. 40%).

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, while the preceding description was mainly directed at liquid cooled fuel cell systems, it is possible to consider using the disclosed methods for air cooled or other fuel cell systems as well. Such modifications are to be considered within the purview and scope of the claims appended hereto.

What is claimed is:

1. A method for starting up a fuel cell system from a starting temperature below 0° C., the system comprising a fuel cell stack comprising a series stack of solid polymer electrolyte fuel cells, the cathodes in the fuel cells comprising an ORR catalyst, the anodes in the fuel cells comprising an HOR catalyst and an OER catalyst wherein the OER catalyst is different from the HOR catalyst, and the fuel cell stack characterized by a maximum output OER/ORR current density wherein the maximum OER/ORR current density is the maximum current density output from the fuel cell stack when operating without a supply of fuel and is a function of fuel cell temperature and relative humidity in the fuel cells, the method comprising:

from the beginning of the starting up until the fuel cell temperature reaches 0° C., drawing a current from the fuel cell stack such that the current density drawn is less than the maximum OER/ORR current density at the fuel cell temperature and at maximum water content.

2. The method of claim 1 wherein the maximum OER/ORR current density is the current density drawn that results in an average fuel cell voltage of −2.2 V.

3. The method of claim 1 comprising drawing a current from the fuel cell stack such that the current density drawn is less than but within 10% of the maximum OER/ORR current density at the fuel cell temperature and at maximum water content.

4. The method of claim 1 comprising:

prior to starting up the fuel cell system, determining the maximum OER/ORR current density as a function of temperature below 0° C.

5. The method of claim 4 comprising determining the maximum OER/ORR current density using a membrane electrode assembly representative of the membrane electrode assemblies in the fuel cells.

6. The method of claim 4 comprising:

prior to starting up the fuel cell system, determining the maximum OER/ORR current density as a function of relative humidity below 0° C.

7. The method of claim 1 wherein the HOR catalyst is platinum.

8. The method of claim 1 wherein the OER catalyst is iridium oxide.

9. The method of claim 1 wherein the fuel cell system additionally comprises a cell voltage monitor for monitoring individual fuel cell voltages in the series stack and the method comprises:
monitoring individual fuel cell voltages in the series stack; and
reducing the current drawn from the fuel cell stack if any individual fuel cell voltage drops below −2.2 volts.

10. The method of claim 1 comprising: from the beginning of the starting up until the fuel cell temperature reaches 0° C., drawing a current from the fuel cell stack such that the current density drawn is less than the maximum OER/ORR current density at the starting temperature and at maximum water content.

11. The method of claim 1 wherein the fuel cell system additionally comprises a temperature monitor for monitoring fuel cell temperature and the method comprises:
monitoring the fuel cell temperature; and
increasing the current density drawn from the fuel cell stack as the fuel cell temperature increases such that the current density drawn is less than the maximum OER/ORR current density at the fuel cell temperature.

12. The method of claim 1 wherein the fuel cell system additionally comprises a high frequency resistance monitor which monitors the high frequency resistance of the fuel cell stack and the method comprises:
monitoring the high frequency resistance of the fuel cell stack;
estimating the relative humidity in the fuel cells based on the measured high frequency resistance;
from the beginning of the starting up, drawing a current from the fuel cell stack such that the current density drawn is less than the maximum OER/ORR current density at the starting temperature and at the starting relative humidity; and
increasing the current density drawn from the fuel cell stack as the fuel cell temperature increases and as the relative humidity in the fuel cells increases such that the current density drawn is less than the maximum OER/ORR current density at the fuel cell temperature and at the relative humidity in the fuel cells.

13. The method of claim 1 wherein the fuel cell system is an automotive fuel cell system.

14. A fuel cell system comprising a fuel cell stack comprising a series stack of solid polymer electrolyte fuel cells, wherein the anodes in the fuel cells comprise an HOR catalyst and an OER catalyst and the OER catalyst is different from the HOR catalyst and wherein the fuel cell system is configured to operate according to the method of claim 1.

* * * * *